United States Patent [19]
Liu et al.

[11] Patent Number: 6,073,338
[45] Date of Patent: *Jun. 13, 2000

[54] THIN FILM READ HEAD WITH COPLANAR POLE TIPS

[75] Inventors: Francis H. Liu, Fremont; Hua-Ching Tong, San Jose; Samuel W. Yuan, San Carlos, all of Calif.

[73] Assignee: Read-Rite Corporation, Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/912,836

[22] Filed: Aug. 19, 1997

[51] Int. Cl.⁷ .............................. G11B 5/127; G11B 5/23
[52] U.S. Cl. ................................... 29/603.14; 29/603.13; 29/603.11; 427/131; 360/113; 360/127
[58] Field of Search ........................ 29/603.11, 603.14, 29/603.15, 603.13, 603.12, 603.08, 603.18; 451/5; 427/131, 130; 360/127, 119, 113

[56] References Cited

U.S. PATENT DOCUMENTS

| | | | |
|---|---|---|---|
| 4,299,680 | 11/1981 | Fontana et al. | 29/603.15 |
| 4,436,593 | 3/1984 | Osborne et al. | 29/603.13 |
| 4,608,293 | 8/1986 | Wada et al. | 360/127 |
| 4,670,972 | 6/1987 | Sakakima | 29/603.13 |
| 4,803,580 | 2/1989 | Mowry | 360/113 |
| 4,912,584 | 3/1990 | Mallary et al. | 360/126 |
| 4,940,511 | 7/1990 | Fontana et al. | 29/603.13 |
| 5,062,196 | 11/1991 | Deroux-Dauphin | 427/131 |
| 5,079,035 | 1/1992 | Krounbi et al. | 29/603.13 |
| 5,488,528 | 1/1996 | Chen et al. | 360/126 |
| 5,634,260 | 6/1997 | Nix et al. | 29/603.14 |
| 5,650,897 | 7/1997 | Cohen et al. | 29/603.15 |
| 5,665,251 | 9/1997 | Robertson et al. | 216/22 |
| 5,745,978 | 5/1998 | Aboaf et al. | 29/603.14 |
| 5,772,493 | 6/1998 | Rottmayer et al. | 451/5 |
| 5,840,420 | 11/1998 | Parker et al. | 427/131 |
| 5,875,542 | 3/1999 | Tran et al. | 29/603.14 |

OTHER PUBLICATIONS

Smith, W. F., Principles of Materials Science and Engineering, McGraw–Hill Book Co., pp. 621–622, 1986.

Primary Examiner—Lee Young
Assistant Examiner—A. Dexter Tugbong
Attorney, Agent, or Firm—Nathan N. Kallman

[57] ABSTRACT

A method of manufacturing a thin film magnetic head which employs pole tips members which are coplanar in a plane across the write gap to produce a written track whose width is determined by the thickness of the pole tip members. The coplanar write structure may be-combined with a multilayer read sensor disposed in the write gap to produce a narrow trackwidth thin film magnetic head having both write and read capabilities.

4 Claims, 4 Drawing Sheets

THIN FILM READ HEAD WITH COPLANAR POLE TIPS

CROSS-REFERENCE TO RELATED APPLICATION

Application Ser. No. 08/844,511 filed Apr. 18, 1997, assigned which issued as U.S. Pat. No. 5,875,542 on Mar. 2, 1999, to the same assignee, discloses methods of fabricating merged inductive write/magnetoresistive read heads utilizing deposition of different metal layers to produce magnetic heads in which the track width is precisely defined and the write gap and the read gap are accurately aligned relative to each other.

FIELD OF THE INVENTION

This invention relates to the fabrication of thin film magnetic heads and in particular to magnetic heads employing coplanar pole tips.

DESCRIPTION OF THE PRIOR ART

The publication, Thin Film Head With Staggered Pole Tips, IEEE Trans. Magn., Volume 27, Number 6, November 1991, page 4710, Wang et al, discusses structures in which the pole tips of a magnetic head overlap each other at their ends in the write gap region, with the amount of the overlap defining the width of the track recorded on a record medium. Such structures are said to relieve the photolithography constraints in pole tip fabrication to permit head fabrication with track widths in the sub-micron range.

SUMMARY OF THE INVENTION

The present invention employs thin film magnetic heads having coplanar pole tips to provide a decrease in the trackwidth of recorded signals on a magnetic record medium. Such a decrease in recorded trackwidth is desirable because it results in an increase in the recorded signal density on the record medium. Coplanar heads of this invention employ magnetic structures in which the magnetic pole tips are coplanar with each other for at least part of their length, and the resulting track width is defined by the thickness of the coplanar pole tips. In one type of such coplanar head, the pole tips are coplanar in a plane extending across the write gap. In another type of coplanar head of this invention, the pole members are spaced from the write gap, and the write gap is formed by thin extensions of the pole members to form pole tips which are coplanar with the plane of the pole members and with a plane across the write gap. Both of these coplanar pole tip configurations result in recorded tracks of decreased trackwidth in the submicron range.

In the embodiment employing coplanar extensions of the pole tips, the extensions can be made of thin and flat materials with high magnetic saturation $B_s$ properties for optimum magnetic performance. In configurations using such pole tip extensions, the head performance is throat height insensitive.

The invention may be employed in inductive write heads to produce recorded tracks of reduced width. The heads may also be employed in combined inductive write/giant magnetoresistive (GMR) or spin-valve read heads having thin read sensor elements such as multilayered GMR sensors or spin-valve sensors. Such sensors can be incorporated in the head gap, resulting in an integrated head with extremely narrow read widths ($\leq 0.1 \mu m$). Such multilayered GMR and spin-valve read sensors can be operated in a CIP (current-in-plane) mode or a CPP (current-perpendicular-to-plane) mode.

BRIEF DESCRIPTION OF THE DRAWINGS

The invention will be described in greater detail with reference the drawing in which.

DESCRIPTION OF THE PREFERRED EMBODIMENT

Figure 1:
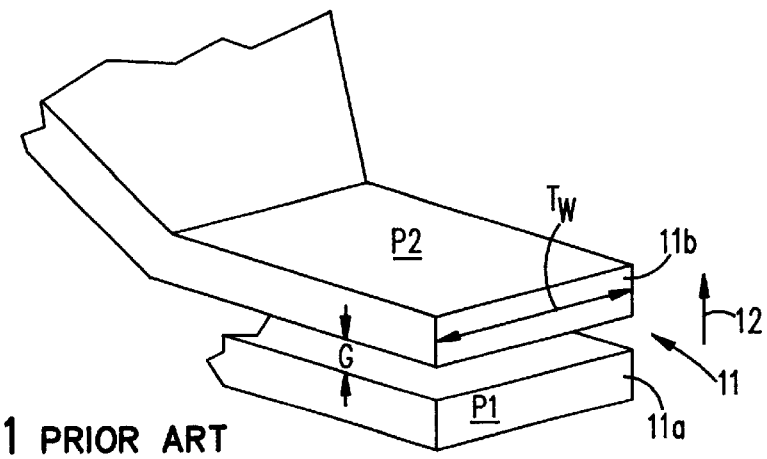
FIG. 1 is an isometric view of a portion of a prior art thin film head.

FIG. 1 shows an embodiment of a prior art head including a pair of P1, P2 pole members having spaced pole tip members 11a, 11b with a write gap G therebetween. In such a head, the record medium on which head 11 writes moves in the direction represented by the arrow 12, and the resulting written trackwidth is determined by the width Tw of the pole tips. Since pole tips of extremely narrow width are difficult to fabricate, producing heads of the type shown in FIG. 1 with a narrow trackwidth represents a manufacturing challenge.

Figure 2A:
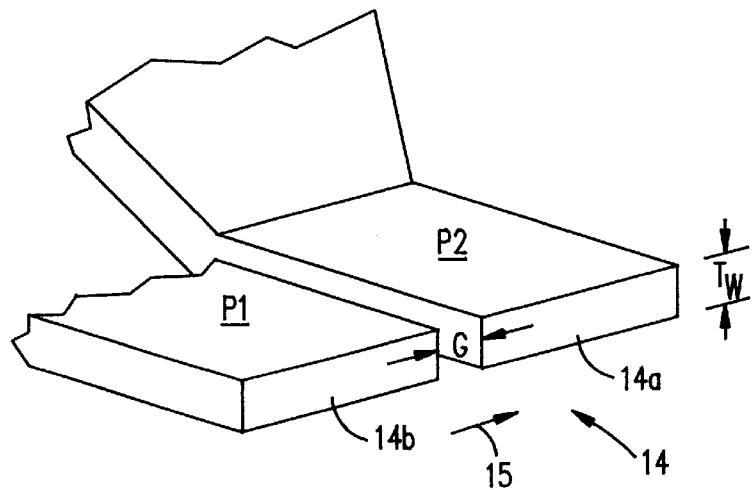
FIGS. 2A and 2B are isometric views of portions of two embodiments of the present invention.

FIG. 2A shows one embodiment of the tip portion of a head 14 in accordance with the present invention. Head 14 includes a pair of P1, P2 pole members having magnetic pole tip portions 14a, 14b of a high magnetic saturation $B_s$ spaced from each other by a write gap G. By high magnetic saturation values $B_s$ as used herein, it is intended to include magnetic materials having magnetic saturation values of from 12–20 kiloGauss. After the pole tip region including pole tip members 14a, 14b, pole members P1, P2 diverge from each other and extend rearward. Pole members P1, P2 converge toward each other at the rear of the head in a back gap region (not shown), as is well known in the art. The record medium (not shown) moves relative to head 14 in a direction represented by the arrow 15 so that the record medium has recorded thereon tracks having a width Tw defined by the thickness of pole tips 14a, 14b, rather than by their width as in the prior art embodiment of FIG. 1.

Figure 2B:
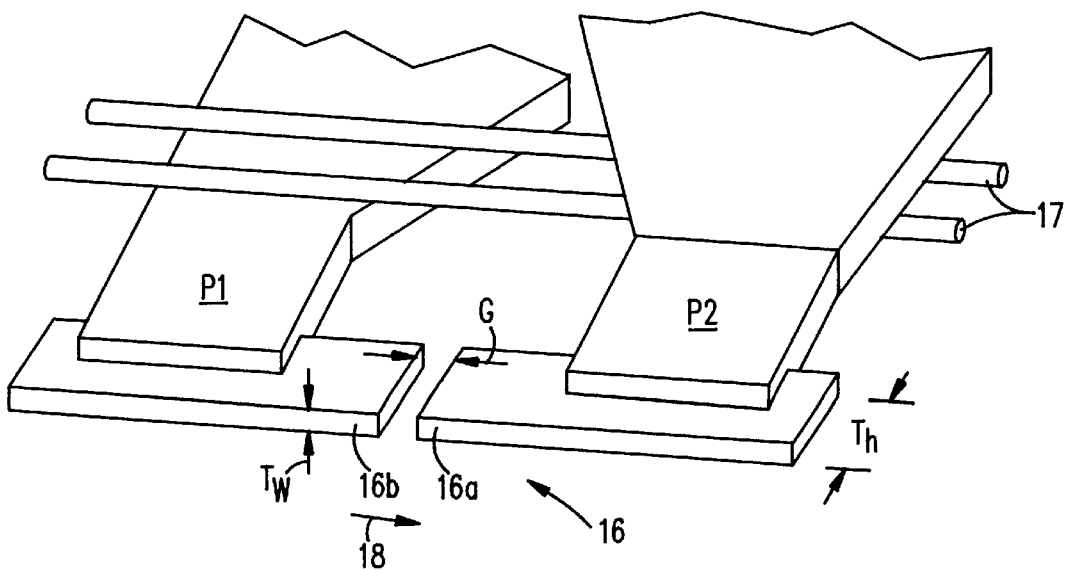

FIG. 2B shows an alternative embodiment of a head 16 in accordance with the present invention in which pole members P1 and P2 are provided in their pole tip regions with extensions 16a and 16b which extend longitudinally from pole members P1 and P2 in the direction of movement of the record medium represented by the arrow 18. Extension members 16a, 16b extend in a direction substantially normal to the direction of pole members P1, P2, with their ends spaced to form the gap G. The resulting recorded trackwidth Tw of the embodiment of FIG. 2B corresponds to the thickness of the extension members 16a and 16b. Members 16a, 16b may be formed of any suitable magnetic material having a high magnetic saturation value $B_s$ as described above. The throat height Th is shown in FIG. 2B. The extended pole configuration of FIG. 2B has the advantage that the deep gap field is insensitive to throat height, which in turn relieves the stringent requirement of throat height lapping control.

Pole members P1 and P2 extend rearward from the pole tip region to form a back gap in the back gap region. Write coils 17 (a portion of which are shown in FIG. 2B) are magnetically coupled to pole members P1 and P2 in a manner well known in the art.

The pole tips of the extended configuration of FIG. 2B can be made of a thin and flat high $B_s$ material, thereby circumventing the problem of slope-induced anisotropy changes (which usually results in low permeability and which is common in conventional head design). While head efficiency is expected to be higher for both embodiments of the coplanar heads of this invention than for conventional thin film heads, due to the reduction of yoke overlay, the coplanar extension embodiment of FIG. 2B is expected to have the highest head efficiency due to the additional yoke separation.

Figure 3A:
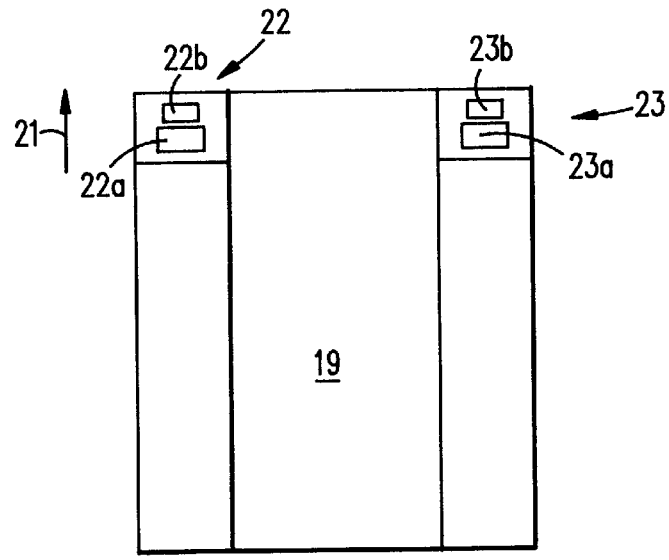
FIG. 3A is a plan view illustrating the fabrication of a prior art thin flim head.
Figure 3B:
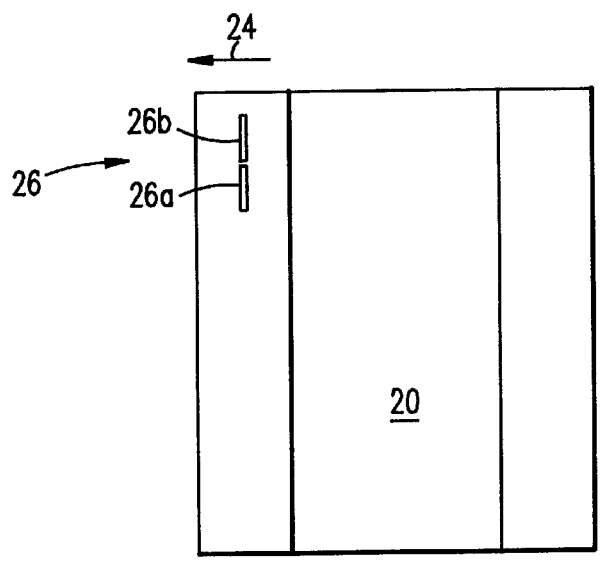
FIG. 3B is a plan view illustrating the fabrication of a thin film hear in accordance with this invention.

FIGS. 3A and 3B illustrate the differences between the fabrication and structure of a prior art head and heads fabricated in accordance with the present invention. In the prior art head of FIG. 3A, deposition of the magnetic structure proceeds on a substrate/slider member 19 in the direction shown by arrow 21. The magnetic portion of the head of FIG. 3A includes a pair of heads 22 and 23, each having P1 poles 22a, 23a spaced by a gap from P2 poles 22b, 23b, respectively. It can be seen that the width of a track recorded by each of heads 22 and 23 will correspond to the thickness of its pole tips 22a, 22b and pole tips 23a, 23b, respectively.

In FIG. 3B, fabrication of a head 26 in accordance with this invention employs deposition of the magnetic structure proceeding in the direction shown by arrow 24, to deposit P1 and P2 coplanar pole elements 26a and 26b. The width of a track recorded by the head of FIG. 3B will correspond to the thickness, rather than the width, of pole tip elements 26a and 26b.

Figure 4:
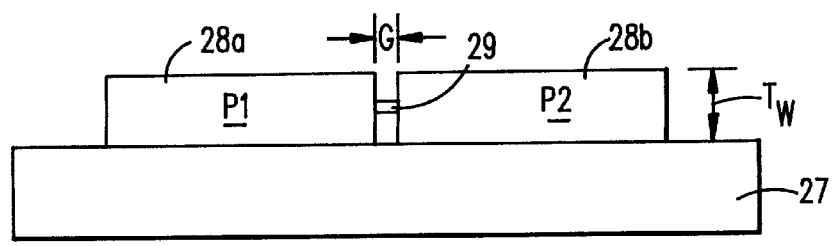
FIG. 4 is a side view showing a combined inductive write/multilayer sensor read head in accordance with the present invention.

FIG. 4 is a side view of an inductive write/multilayer sensor read head in accordance with this invention showing P1 and P2 pole elements 28a and 28b located on a substrate 27, with the facing surfaces of pole tip elements 28a, 28b separated by a gap G. The structure has a recording track-width $T_w$ corresponding to the thickness of pole members 28a and 28b. Disposed in gap G is a multilayer read sensor element 29 which may be a multilayer GMR sensor or a multilayer spin valve sensor. A sequence of steps for fabricating a head according to FIG. 4B is shown in FIGS. 5A–5H and will be described in detail below.

Figure 5A:
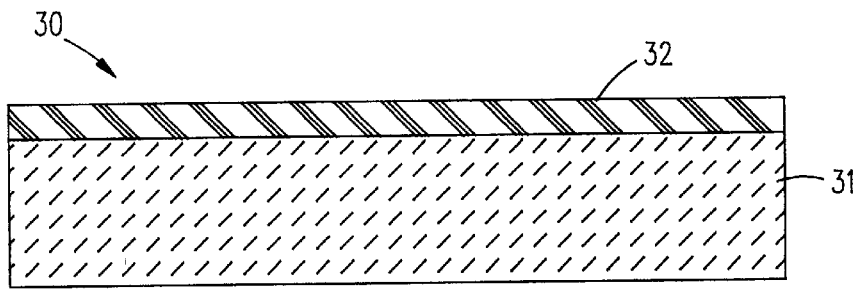
FIGS. 5A–5H illustrate a sequence of steps which may be employed to fabricate a combined write/read thin film head of the present invention.
Figure 5B:
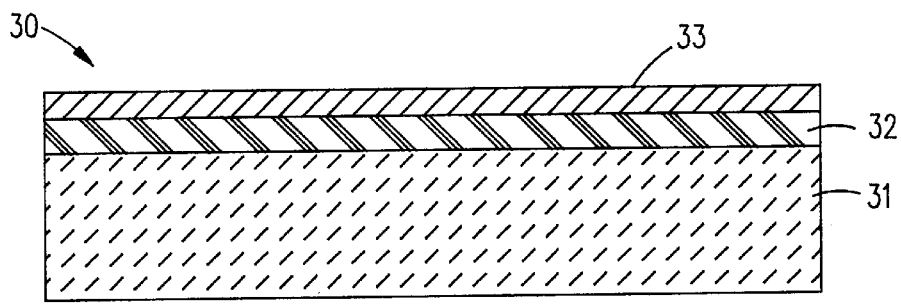

FIGS. 5A–5H illustrate a sequence of steps in fabricating an inductive write/multilayer read sensor thin film head in accordance with this invention. In FIG. 5A, numeral 30 designates a thin film magnetic head having a nonmagnetic substrate 31 on which is deposited a layer of alumina 32. A multilayer GMR or spin valve sensor layer 33 is formed on alumina layer 32, as shown in FIG. 5B. Layer 33 may be in the form of a multilayer spin-valve including layers of NiFe/Cu/NiFe/FeMn/Cu/NiFe/Cu/NiFe/FeMn. If a multilayer GMR element is to be utilized, it may be in the form of $[NiFeCo]_n[Cu]_{n-1}$.

Figure 5C:
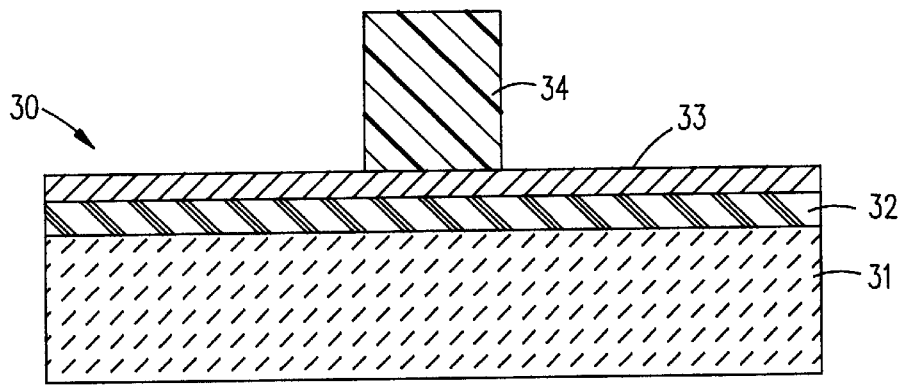
Figure 5D:
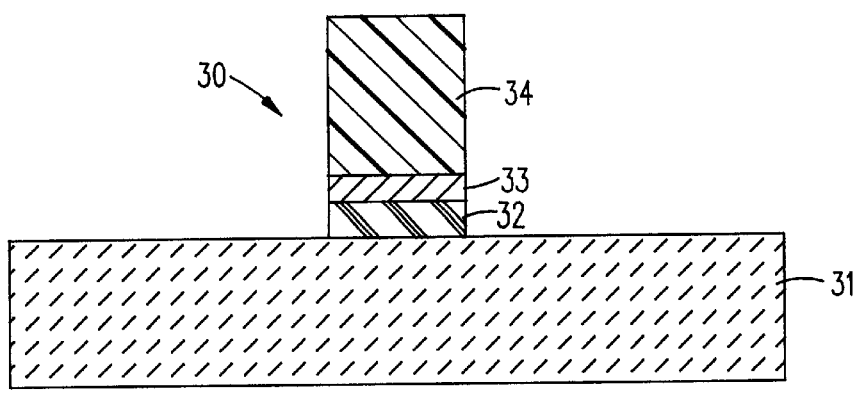

After formation of multilayer sensor layer 33, a photoresist masking layer 34 is applied to the central portion of the structure (FIG. 5C). The portions of sensor layer 33 and alumina layer 32 outside photoresist masking layer 34 in the central portion are removed by ion milling or the like. This leaves a structure as shown in FIG. 5D, with multilayer sensor element 33 and layer 32 extending up from substrate 31 in the central portion thereof.

Figure 5E:
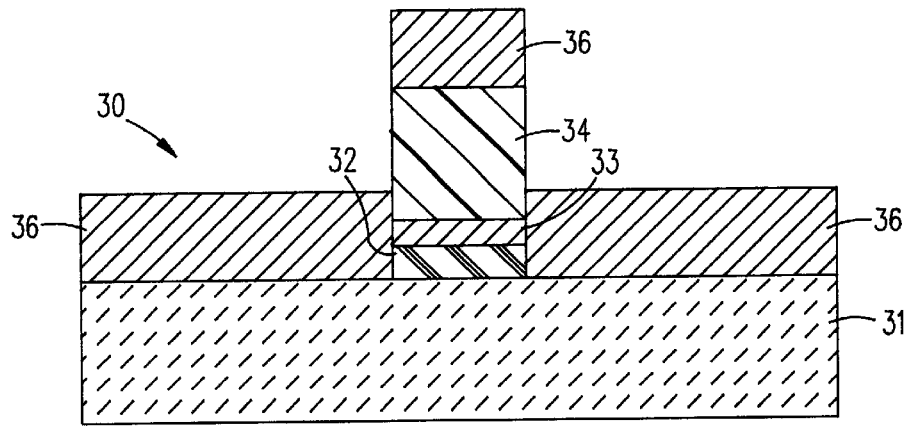
Figure 5F:
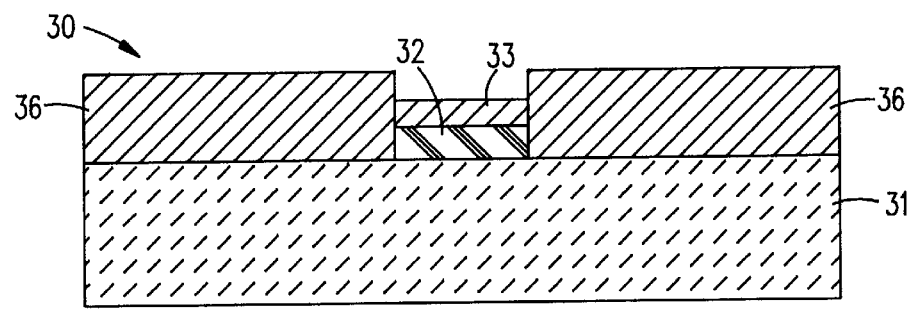
Figure 5G:
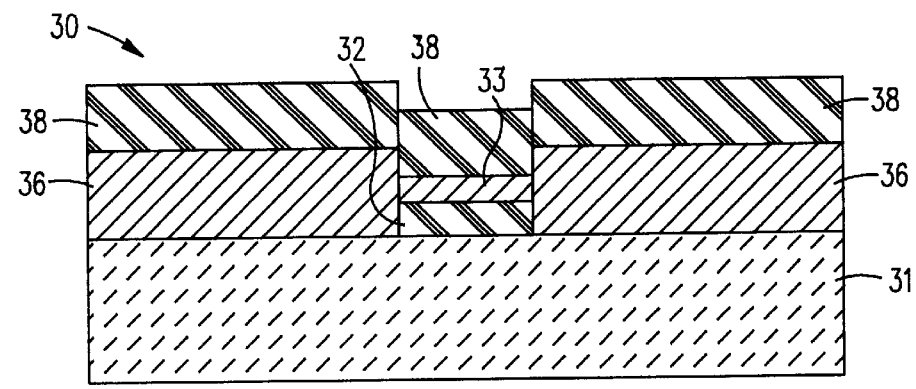
Figure 5H:
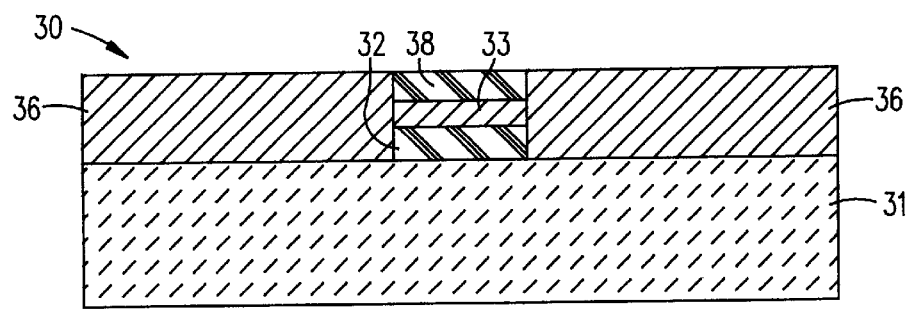

As shown in FIG. 5E, a layer of NiFe or other high $B_s$ magnetic material 36 is sputtered on the top of the structure. Photoresist 34 (and the portion of high $B_s$ layer 36 deposited thereon) is then removed (FIG. 5F), leaving high $B_s$ layer 36 adjacent to the sides of multilayer sensor element 33 and alumina layer 32. A layer 38 of alumina is then deposited on high $B_s$ layer 36 (FIG. 5G), and the upper surface is planarized by lapping or other suitable technique to produce a structure as shown in FIG. 5H. In this structure, the portions of high $B_s$ layer 36 on each side of multilayer sensor element 33 form the pole members P1 and P2 of the coplanar write head, while multilayer sensor element 33 forms a read element in the gap member located in the gap between pole members P1, P2. The thickness of the separate portions of magnetic layer 36 define the width of the written track, with the write gap G defined by the space between the facing ends of poles P1 and P2.

When an inductive write head with coplanar pole tip members in accordance with this invention is to be fabricated without a multilayer sensor element in the write gap therein as shown in FIGS. 5A–5H, the write gap may be formed by the deposition of alumina or other suitable nonmagnetic material in the gap region.

While multilayered spin-valves do not require a transverse bias, multilayered GMR structures can utilize the exchange-coupled soft-film transverse bias system proposed by Rottmayer et al. in the publication entitled A New Design For An Ultra-High Density Magnetic Recording Head Using A GMR Sensor In The CPP Mode, IEEE Trans. Magn., Vol. 31, page 2597 (1995). Such biased structures are expected to have higher $\Delta R/R\%$, where R is the resistivity of the GMR sensor element. For multilayered spin-valve read elements, a large DC (direct current) longitudinal field from the write poles can be used to align the free layer magnetization in the same direction prior to readback, and a small DC longitudinal field from the write poles can be used as longitudinal bias for domain stabilization during readback. Additionally, a CIP configuration of the heads of this invention can be employed in multilayered GMR and spin-valve read elements by using the write poles as conductors to supply a sensing current. A CPP configuration can be obtained by fabricating conductors at the bottom and the top layers of the multilayer GMR or spin-valve read elements to supply sensing current.

What is claimed is:

1. A method of fabricating a thin film magnetic head assembly formed with an inductive write head having coplanar pole tip members of defined thickness and a multilayer sensor read head disposed on a substrate comprising the steps of:

depositing a first layer of nonmagnetic material on said substrate;

next depositing a layer of gap material on said first layer of nonmagnetic material;

next removing portions of said first layer of nonmagnetic material and said layer of gap material except in a central portion thereof, to expose the upper surface of said substrate on each side of said central portion, and to form a gap member from said gap layer in said central portion;

next depositing a layer of high saturation magnetic material on said exposed upper surface of said substrate to form coplanar layer of high saturation magnetic material; and next depositing a second layer of nonmagnetic material on said gap member in said central portion;

next forming a multilayer read sensor in said gap layer to form an inductive write/multilayer read sensor magnetic head;

said first nonmagnetic layer, said gap member and said second nonmagnetic layer forming a gap between said coplanar layers of said high saturation magnetic material on each side of said central portion to form coplanar magnetic pole tips;

wherein the thickness of the coplanar pole tips define a trackwidth of recorded signals.

2. A method in accordance with claim 1 including the step of:

next depositing said second layer of nonmagnetic material on said gap layer in said central portion and on said upper surface of said high saturation magnetic material on each side of said central portion; and then planarizing said second layer of nonmagnetic material to remove said second layer of nonmagnetic material from the upper surface of said layer of high saturation magnetic material and to level said second layer of nonmagnetic material on said gap member.

3. A method of fabricating a thin film magnetic head assembly formed with an inductive write head having coplanar pole tip members of defined thickness and a multilayer sensor read head disposed on a substrate, comprising the steps of:

depositing a first layer of a nonmagnetic material on said substrate;

next depositing a multilayer sensor element on said first nonmagnetic layer;

next removing portions of said multilayer sensor element and said nonmagnetic layer from said substrate except in a central portion thereof;

next depositing a layer of high saturation magnetic material on said substrate and on said central portion;

next removing said deposited layer of high magnetic saturation material from said central portion to expose one surface of said multilayer sensor element in said central portion; and next depositing a second layer of a nonmagnetic material on said exposed surface of said multilayer sensor element;

said first layer of nonmagnetic material, said multilayer sensor element and said second layer of nonmagnetic material forming a nonmagnetic gap between the coplanar layers of high saturation magnetic material on each side of said central portion which form coplanar magnetic pole tips.

4. A method in accordance with claim 3 including the steps of:

depositing said second layer of nonmagnetic material on said exposed surface of said multilayer sensor element and on said deposited layer of high saturation magnetic material, and next planarizing the upper surface of said second layer of nonmagnetic material to level second layer of nonmagnetic material on said exposed surface of said multilayer sensor element;

wherein the thickness of the coplanar pole tips define a trackwidth of recorded signals.

\* \* \* \* \*